Dec. 8, 1959 M. RETTINGER 2,915,812
METHOD OF CONSTRUCTING MAGNETIC HEADS
Original Filed April 21, 1953

INVENTOR.
Michael Rettinger
BY Morris L. Rabkin
ATTORNEY.

United States Patent Office 2,915,812
Patented Dec. 8, 1959

2,915,812

METHOD OF CONSTRUCTING MAGNETIC HEADS

Michael Rettinger, Encino, Calif., assignor to Radio Corporation of America, a corporation of Delaware Original application April 21, 1953, Serial No. 350,188, now Patent No. 2,756,280, dated July 24, 1956. Divided and this application March 9, 1956, Serial No. 570,528

6 Claims. (Cl. 29—155.59)

This invention relates to multiple magnetic head structures, and particularly to a method of constructing such heads to provide an efficient and pre-aligned final integral assembly. This application is a division of my copending application, Serial No. 350,188, filed April 21, 1953, entitled "Multiple Magnetic Head Construction," now Patent No. 2,756,280 of July 24, 1956.

Multiple magnetic track recording systems are well known. The majority of these systems use coaxial ring-type magnetic heads arranged transversely across the magnetic record medium. When a plurality of such heads, as shown in my U.S. Patent No. 2,628,286 of February 10, 1953, are individually constructed, the mounts for such heads require adjusting mechanisms for each head to insure that the gaps between the pole tips of the cores are in alignment, that the proper film bearing is obtained, and that each gap has the proper orientation with respect to the direction of movement of the magnetic medium being recorded or reproduced. The problems encountered and the complexity of such mounts are disclosed in Pettus co-pending application, Serial No. 230,403, filed June 7, 1951, now Patent No. 2,644,856 of July 7, 1953.

The present invention is directed to a method of constructing a multiple track recording or reproducing head, which, when finally assembled, will have all the faces of the pole tips in two respective parallel planes. Also, the bearing and contact relationship between the magnetic medium and the pole tips will be the same for all heads. Thus, only a simple adjustment or two are required to correct for any azimuth variation for all heads or possible contact differences on opposing pole pieces. The method of construction described hereinafter permits the multiple head assembly to be economically constructed while providing the heads with the maximum of sensitivity, the desired frequency characteristics, and the minimum of cross-talk between the heads. The final head assembly is very small for any particular number of heads.

The principal object of the invention, therefore, is to facilitate the construction of multiple magnetic head units.

Another object of the invention is to provide an improved method of constructing a multiple magnetic head unit.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 1, 2, 3, 4, 5:
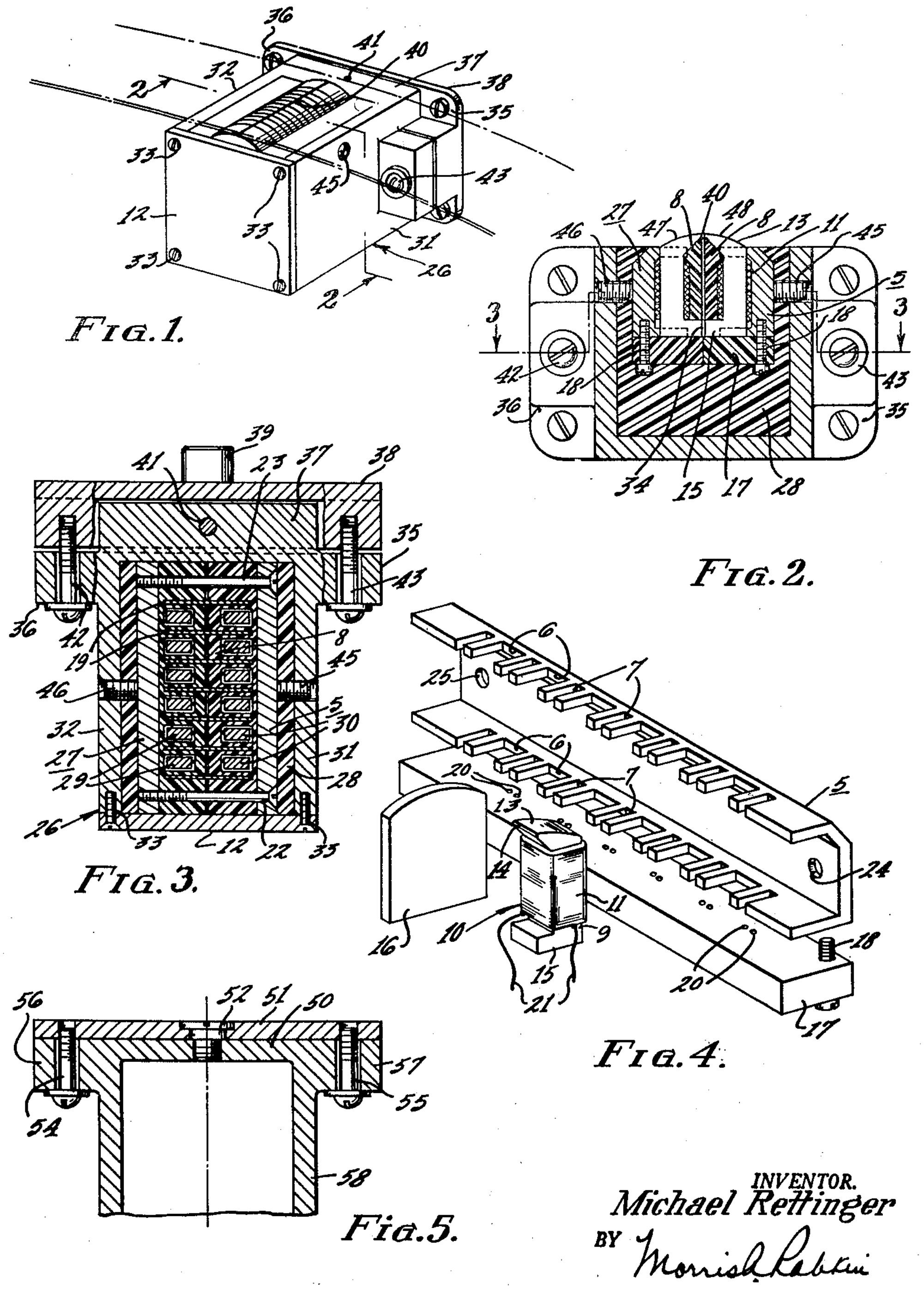
Fig. 1 is a perspective view showing a multiple magnetic head assembly embodying the invention.
Fig. 2 is a cross-sectional view of the invention taken along the line 2—2 of Fig. 1.
Fig. 3 is a cross-sectional view of the invention taken along the line 3—3 of Fig. 2.
Fig. 4 is an exploded view of the elements forming a cluster or group of half head sections.
Fig. 5 is a detail view of a mounting to obtain a rotational adjustment.

Referring now to the drawings, in which the same numerals identify like elements, and particularly referring to Fig. 4, a brass frame or rail 5 is used to mount and assemble half sections of the heads into a cluster or group of half sections. The frame 5 is U-shaped, and has a plurality of wide notches 6 alternately disposed with a plurality of narrow notches 7, these notches being in both legs of the frame. In the aligned wide notches 6 in both legs of frame 5, are positioned respective ends of the cores of the half head sections, one half head section being shown at 10 with its U-shaped core 9. This half head section 10 also has a coil 11 of a certain predetermined number of turns of wire on the central portion thereof. The pole tip section 13 of the half head section 10 is tapered to form a pole face 14, while the lower end 15 is rectangular in shape. In the particular frame 5, provision is made for six half sections 10 and seven partitions 16. The frame could be slotted for forming other numbers of heads. A terminal board or plate 17 is fastened to the rack or frame 5 by screws such as shown at 18. The board has holes 20 therein through which the leads 21 of the coil 11 are passed and connected to terminals (not shown) on the opposite side of the board. The head half sections are carefully adjusted in the notches or slots 6 so the head height, bearing, rotation, and track placement are the same for each section.

After six, or whichever number of half head sections are to be assembled, are correctly positioned in the frame 5 along with partitions 16 in slots 7 and the terminal plate 17 is fastened thereto, this cluster is placed in a form which is filled with a casting resin and placed in an oven for curing. This plastic is illustrated at 8 in Fig. 2. Before the partitions 16, which are approximately .020 of an inch thick, are placed in their respective notches 7, they are greased. Now, before the resin has completely cooled, the greased partitions can be easily removed, leaving grooves in the resin in which slightly thinner Mumetal shields, such as shown at 19 in Fig. 3, are placed. With the partitions 16 removed, the pole faces 14 of all of the half sections 10 in the cluster can be simultaneously lapped on a flat plate, thus assuring that the pole faces will all be in the same plane.

The next step in constructing the final assembly is to take two clusters, such as just described, and fasten them together by screws, such as shown at 22 and 23, passing through holes 24 and 25, respectively, in the rack 5 and threaded in holes in the opposing rack, such as shown at 27 in Fig. 3. A non-magnetic spacer of .0002 of an inch thick, as shown at 40, is placed between opposing pole faces. There is also a back-gap spacer 34, .004 of an inch thick. (See Fig. 2.) The clusters are then placed in a five-sided receptacle or casing 26, one end being a plate 12 attached to the side walls 31 and 32 by screws 33. The other end of the casing, as shown in Figs. 1 and 3, has bosses or ears 35 and 36 on the sides 31 and 32, respectively, and edge extensions or flanges 37 which form a groove therebetween. A mounting plate 38 has a portion within the groove and a mounting stud 39. A pin 41 passes through the flanges and plate 38 so that the casing may pivot on the pin 41 by loosening one or the other of screws 42 and 43 and tightening the opposite screw. This adjustment will adjust the heads for azimuth.

As mentioned above, the casing or receptacle 26 has five sides, one side being open. The assembly of the two half head section clusters held together by screws 22 and 23 is now positioned in casing 26. To properly position the clusters within the receptacle, set screws 45 and 46 are threaded through the sides 31 and 32 and abut against the frames 5 and 27. The assembly of both clusters is now plasticized in the metal receptacle 26 in the same manner as the individual clusters were previously plasticized. This plastic is shown at 28. Thus, there is provided a structure which has, in the present instance, a plurality of six heads illustrated by cores 29 and 30 in Fig. 3 with seven Mumetal shields 19. The bearing surfaces 47 and 48 of the pole tips of the head shown in Fig. 2 are properly aligned with the bearing surfaces of the pole tips of the other heads, the pole faces, forming the recording and reproducing gaps, being in two parallel planes.

Referring now to Fig. 5, a casing 58 has bosses 56 and 57 adjacent one end wall 50 thereof. In this instance, the end 50 abuts a mounting plate 51 through which a bearing screw 52 passes and which is threaded into the end wall 50. Screws 54 and 55 pass through oversized holes in the bosses 56 and 57, respectively, so that the casing 58 may be slightly rotated on the axis of the screw 52. It is also to be understood that the plate 51 may be positioned adjacent the plate 38 to provide a rotational adjustment in combination with the azimuth pivoting structure, if desired or necessary. Since location pins are usually used to position the casing 26 or the casing 58 in a recorder or reproducer, very little, if any, further adjustments are required.

It has been found that, by constructing any number of ring-type magnetic heads by forming clusters of half head sections, the final assemblies may be produced quickly and economically, while providing particularly sensitive and efficient heads for multiple magnetic track recording.

I claim:

1. The method of assembling a plurality of magnetic heads in a casing comprising aligning half head sections in a fixed relationship to one another so that the head height is the same for each section and the pole tip face of each section is in substantially the same plane, interposing partitions between said half head sections, embedding said assembled sections and partitions in a plastic to form a group of half head sections, removing said partitions after the hardening of said plastic to provide spaces in said plastic formerly occupied by said partitions, lapping the pole tip faces of all of said half head sections simultaneously to place said faces in one plane, assembling two groups of lapped half head sections with one-piece separating shields extending between pairs of said half head sections in the spaces provided by the removal of said partitions so the lapped faces oppose one another with gaps therebetween, and embedding said groups in a plastic.

2. The method of claim 1 in which said groups are embedded in said plastic while positioned within an open-sided casing with the pole tips of said half head sections extending beyond the surface of the open side of said casing.

3. The method of constructing a plurality of magnetic heads having the opposing faces of their air gaps in a pair of parallel planes comprising forming a plurality of identical half head sections, assembling an equal number of said half head sections with separating partitions between said half head sections into two groups, each half head section in each respective group being the same with respect to head height and having their pole tip faces in substantial alignment, embedding said groups in elastic, removing the partitions from said groups after said plastic has hardened to provide spaces in said plastic formerly occupied by said partitions, simultaneously lapping the faces of the pole tips in each group to place said faces in the same respective plane, aligning a pair of said groups with the faces of their pole tips opposing one another in spaced parallel planes with one-piece shields extending between pairs of said half head sections in the positions formerly occupied by said partitions, and embedding said groups in a plastic.

4. The method of claim 3 in which said groups are embedded in said plastic while positioned within an open-sided casing with the pole tips of said half head sections extending beyond the surface of the open side of said casing.

5. The method of assembling a magnetic head in a casing which comprises forming a pair of separate half magnetic head sections, aligning each of said half magnetic head sections with a partition in parallel relationship alongside of each of said half head sections and spaced therefrom, said half head sections having the same head height with their pole faces in substantially the same plane, embedding each of said assembled sections and said partition in a plastic to form a unit, removing said partitions from each of said units after the hardening of said plastic, lapping the pole faces of each of said half magnetic head sections, aligning said pole faces of each of said half magnetic head sections opposing one another with a spacer therebetween and with a one-piece shield extending across each pair of said half head sections in the position formerly occupied by said partitions, and embedding said units in a plastic.

6. The method of claim 5 in which said units and plastic are positioned in an open-sided casing with the pole tips of said half magnetic head sections extending beyond the surface of the open side of said casing.

References Cited in the file of this patent

UNITED STATES PATENTS

| | | |
|---|---|---|
| 2,479,695 | Morin | Aug. 23, 1949 |
| 2,743,507 | Kornei | May 1, 1956 |

UNITED STATES PATENT OFFICE

CERTIFICATE OF CORRECTION

Patent No. 2,915,812 December 8, 1959

Michael Rettinger

It is hereby certified that error appears in the printed specification of the above numbered patent requiring correction and that the said Letters Patent should read as corrected below.

Column 4, line 14, for "elastic" read -- plastic --.

Signed and sealed this 14th day of June 1960.

(SEAL)
Attest:

KARL H. AXLINE
Attesting Officer

ROBERT C. WATSON
Commissioner of Patents